(12) United States Patent
Hara (10) Patent No.: US 10,974,582 B2
(45) Date of Patent: Apr. 13, 2021

(54) ELECTRIC VEHICLE (71) Applicant: Toyota Jidosha Kabushiki Kaisha, Toyota (JP)

(72) Inventor: Yasuhiro Hara, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 49 days.

(21) Appl. No.: 16/570,332

(22) Filed: Sep. 13, 2019

(65) Prior Publication Data

US 2020/0086730 A1 Mar. 19, 2020

(30) Foreign Application Priority Data

Sep. 18, 2018 (JP) .............................. JP2018-174198

(51) Int. Cl.
*B60K 1/04* (2019.01)
*G05D 1/02* (2020.01)
*B60P 3/20* (2006.01)
*B60P 1/43* (2006.01)

(52) U.S. Cl.
CPC .............. *B60K 1/04* (2013.01); *G05D 1/021* (2013.01); *B60K 2001/0438* (2013.01); *B60P 1/43* (2013.01); *B60P 3/20* (2013.01); *B60Y 2200/91* (2013.01); *B60Y 2306/05* (2013.01)

(58) Field of Classification Search
CPC .. B60K 1/00; B60K 2001/0438; G05D 1/021; B60P 1/43; B60P 1/431; B60P 3/20; B60P 3/205; B60Y 2200/91; B60Y 2306/05
USPC .............................................. 180/65.8
See application file for complete search history.

(56) References Cited

U.S. PATENT DOCUMENTS

| 9,494,940 | B1* | 11/2016 | Kentley | B60W 10/04 |
| 10,493,893 | B2* | 12/2019 | Matsuoka | B60P 1/436 |
| 10,737,737 | B2* | 8/2020 | Birnschein | B60K 17/358 |
| 2018/0095473 | A1* | 4/2018 | Fakhfakh | G05D 1/024 |
| 2019/0360433 | A1* | 11/2019 | Poolman | B60H 1/00014 |

FOREIGN PATENT DOCUMENTS

CN 107554396 A 1/2018

OTHER PUBLICATIONS

U.S. Appl. No. 16/543,808, filed Aug. 19, 2019; Inventors: Yasuhiro Hara et al.

(Continued)

*Primary Examiner* — John D Walters
(74) *Attorney, Agent, or Firm* — Dinsmore & Shohl LLP (57) ABSTRACT

There is provided an electric vehicle including: a battery that is accommodated beneath a floor of an in-vehicle space portion; a temperature-adjustable storage unit that is accommodated in the in-vehicle space portion; a driving unit that is provided at a vehicle longitudinal direction one side of the battery; an electric power converter for driving that is disposed, in a vehicle longitudinal direction, disposed within a range that extends from the battery to an end portion of a vehicle longitudinal direction outer side of the driving unit, and that is electrically connected to the battery and the driving unit; an electric power converter for the storage unit that is disposed within the range and that is electrically connected to the storage unit; and a control unit that controls autonomous driving of the vehicle.

8 Claims, 6 Drawing Sheets

(56) References Cited

OTHER PUBLICATIONS

U.S. Appl. No. 16/540,453, filed Aug. 14, 2019; Inventors: Yasuhiro Hara et al.
U.S. Appl. No. 16/543,902, filed Aug. 19, 2019; Inventors: Ayano Tsuruta et al.
U.S. Appl. No. 16/539,304, filed Aug. 13, 2019; Inventors: Yasuhiro Hara et al.

* cited by examiner

FIG.6

ELECTRIC VEHICLE

CROSS-REFERENCE TO RELATED APPLICATION

This application is based on and claims priority under 35 USC 119 from Japanese Patent Application No. 2018-174198 filed on Sep. 18, 2018, the disclosure of which is incorporated by reference herein.

BACKGROUND

Technical Field

The present disclosure relates to an electric vehicle.

Related Art

Chinese Patent Application Publication No. 107554396 discloses a multifunctional passenger vehicle having an autonomous driving function. This document discloses that a refrigerator is disposed beneath a cabinet.

In a case in which a temperature-adjustable storage unit, such as a refrigerator, a freezer or the like, is installed in an electric vehicle, there is room for improvement in the arrangement of the battery, inverters, converters and the like, from the standpoint of ensuring safety with respect to a collision.

SUMMARY

An object of the present disclosure is to provide an electric vehicle that can ensure safety with respect to a collision in a case in which a temperature-adjustable storage unit is installed within the vehicle.

An electric vehicle of a first aspect includes: a battery that is accommodated beneath a floor of an in-vehicle space portion; a temperature-adjustable storage unit that is accommodated in the in-vehicle space portion; a driving unit that is provided at a vehicle longitudinal direction one side of the battery; an electric power converter for driving that is disposed, in a vehicle longitudinal direction, disposed within a range that extends from the battery to an end portion of a vehicle longitudinal direction outer side of the driving unit, and that is electrically connected to the battery and the driving unit; an electric power converter for the storage unit that is disposed within the range and that is electrically connected to the storage unit; and a control unit that controls autonomous driving of the vehicle.

A cargo room that can accommodate cargo and a vehicle cabin are examples of the in-vehicle space portion in the electric vehicle of the first aspect. A refrigerator, a freezer, and a heating cabinet are examples of the storage unit. In the electric vehicle of the first aspect, the electric power converter for driving and the electric power converter for the storage unit are disposed further toward the vehicle longitudinal direction inner side than the end portion of the vehicle longitudinal direction outer side of the driving unit. Here, the driving unit includes a motor for traveling and a transaxle, and has a case that has high rigidity. Therefore, at the time of a collision, the driving unit functions as an impact resistant portion. Accordingly, in accordance with this electric vehicle, breakage of the electric power converter for driving, which is needed for the driving of the vehicle, and of the electric power converter for the storage unit, which is needed for the operation of the storage unit, can be suppressed. Namely, safety with respect to a collision can be ensured in a case in which a temperature-adjustable storage unit is installed.

In an electric vehicle of a second aspect, the control unit is disposed at a vehicle longitudinal direction another side of the battery.

In the electric vehicle of the second aspect, the control unit that is the autonomous driving control system is disposed, in the vehicle longitudinal direction, at the side that is opposite the electric power converter for the storage unit, the electric power converter for driving, and the driving unit that are equipment through which current, that is higher voltage than the control signals, flows. Namely, the control unit is set apart from the electric power converter for the storage unit, the electric power converter for driving and the driving unit. Due thereto, in accordance with this electric vehicle, influence of electromagnetic noise, generated from the equipment through which high-voltage current flows, on the autonomous driving control system can be reduced.

An electric vehicle of a third aspect includes a branch box that is electrically connected to the battery, and that branches electric power of the battery between the electric power converter for driving and the electric power converter for the storage unit.

In accordance with the electric vehicle of the third aspect, by using the branch box, the power source for the storage unit and the battery that is the power source for driving are used in common. Due thereto, a lightening of the weight of and a reduction in the cost of the vehicle can be devised as compared with a case in which a battery for the storage unit is separately installed.

An electric vehicle of a fourth aspect includes: an opening that is provided in a vehicle transverse direction wall portion at the in-vehicle space portion, and through which cargo can be loaded and unloaded; and a ramp that can be accommodated between the battery and a floor surface of the in-vehicle space portion, and that, at the opening portion, extends from the floor surface toward an exterior of the in-vehicle space portion.

In accordance with the fourth aspect, the work of loading and unloading cargo and dollies can be carried out easily by eliminating the step between the floor surface of the in-vehicle space portion and the sidewalk or the roadway.

In an electric vehicle of a fifth aspect, the in-vehicle space portion includes a normal temperature room that is a space at which temperature adjustment is not carried out, and the storage unit is disposed in the in-vehicle space portion at further toward the driving unit side than the normal temperature room.

In accordance with the electric vehicle of the fifth aspect, the length of the wires that connect the storage unit and the electric power converter for the storage unit can be shortened by placing the storage unit near to the driving unit in the in-vehicle space portion.

In accordance with the present disclosure, safety with respect to a collision can be ensured in a case in which a temperature-adjustable storage unit is installed.

BRIEF DESCRIPTION OF THE DRAWINGS

Exemplary embodiments of the present disclosure will be described in detail based on the following figures, wherein.

DETAILED DESCRIPTION

An electric vehicle relating to an embodiment of the present disclosure is described by using the drawings. Note that, in the respective drawings, arrow FR indicates the vehicle front side, arrow UP indicates the vehicle upper side, arrow LH indicates the vehicle transverse direction left side, and arrow RH indicates the vehicle transverse direction right side. In the respective embodiments, the vehicle rear side corresponds to one side, and the vehicle front side corresponds to another side.

First Embodiment (Structure)

Figure 1:
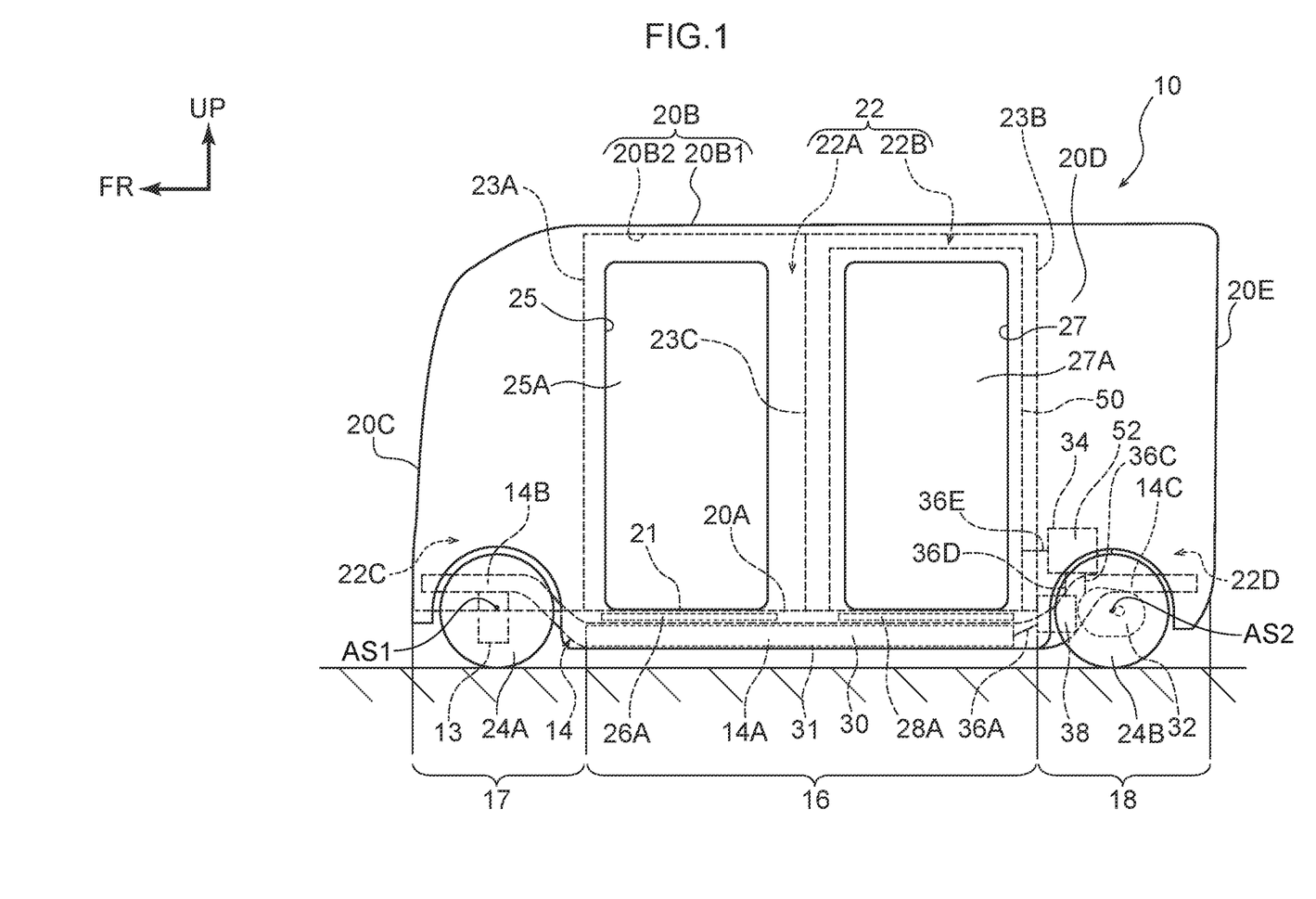
FIG. 1 is a side view of an electric vehicle relating to a first embodiment.
Figure 2:
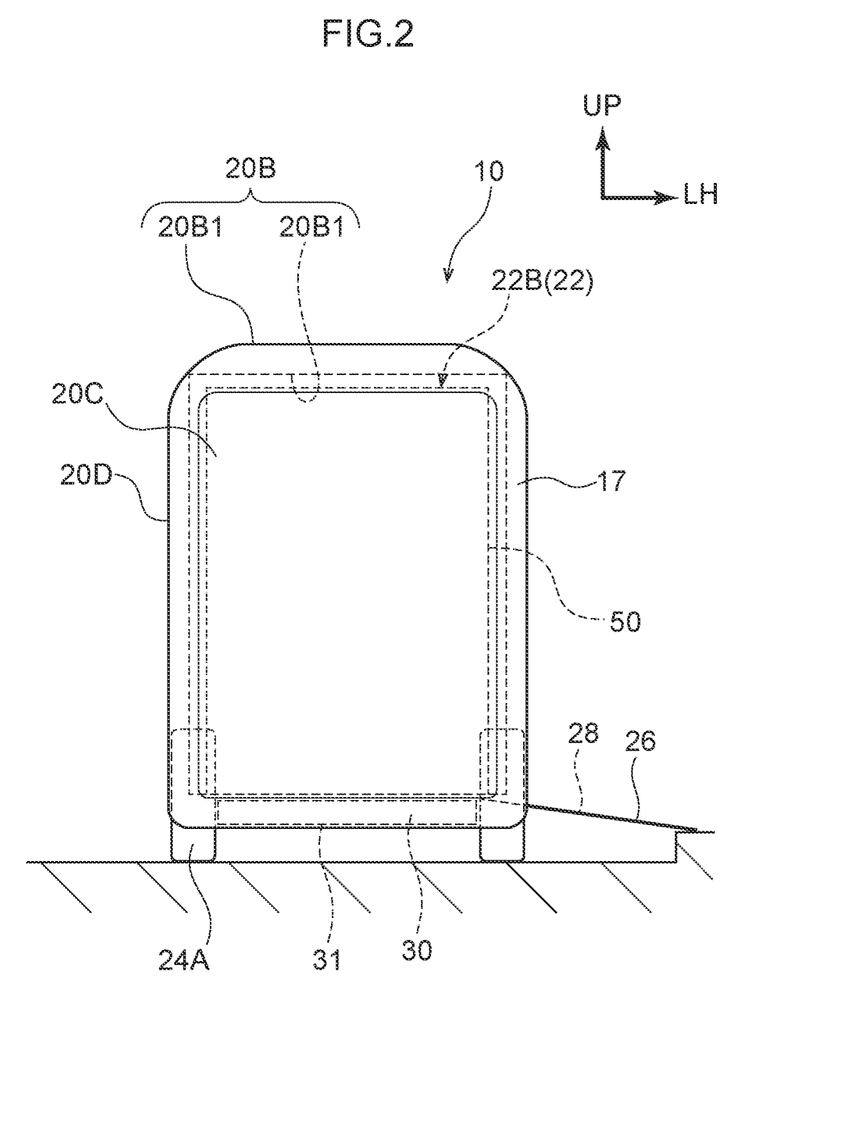
FIG. 2 is a front view of the electric vehicle relating to the first embodiment.

A vehicle 10 that serves as an electric vehicle of the present embodiment is an electric automobile by which completely autonomous driving is possible. As shown in FIG. 1 and FIG. 2, the exterior of the vehicle 10 is a substantially rectangular parallelepiped shape that is enclosed by a roof 20B, a front wall portion 20C, side wall portions 20D and a rear wall portion 20E. Front wheels 24A are provided at the vehicle front side, and rear wheels 24B are provided at the vehicle rear side.

Figure 3:
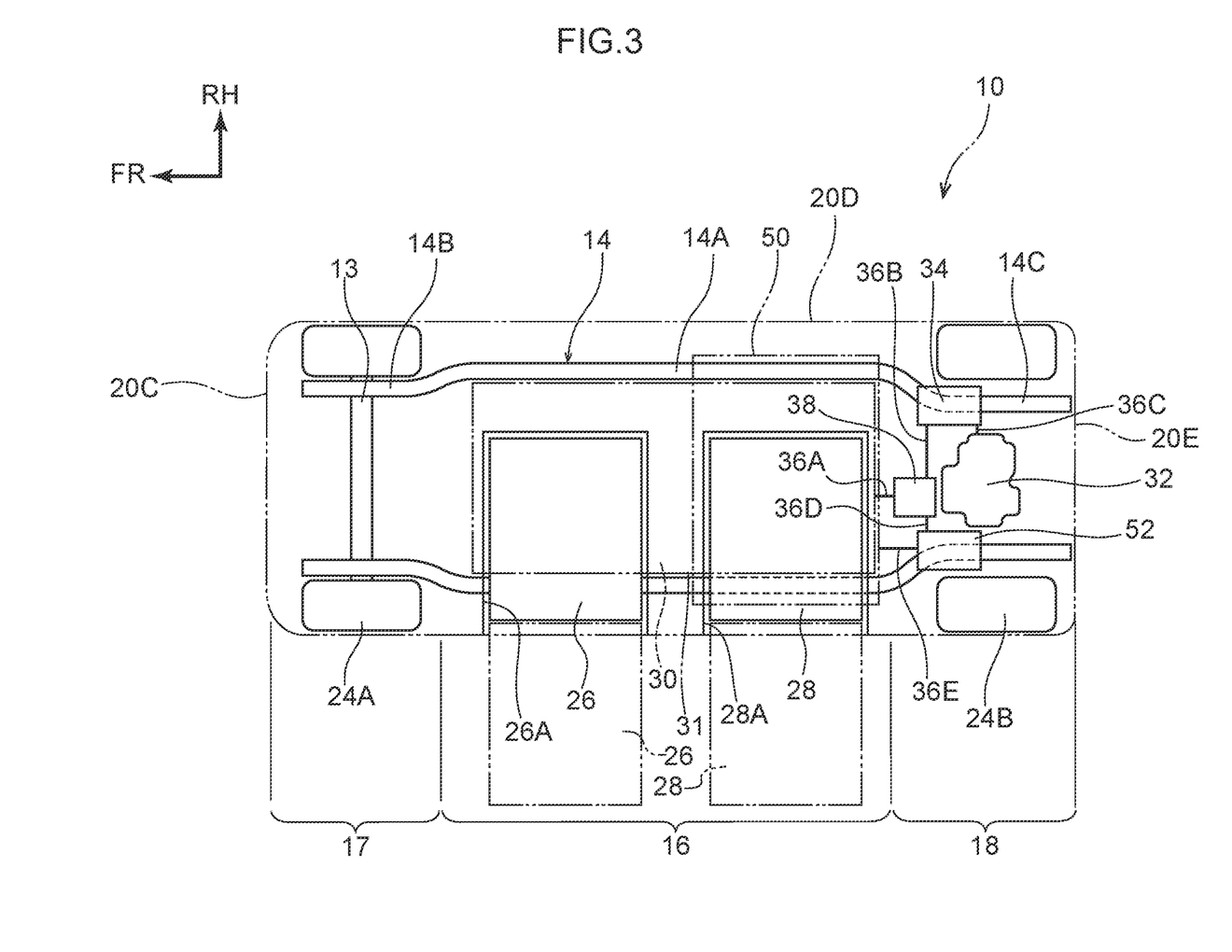
FIG. 3 is a plan sectional view of the electric vehicle relating to the first embodiment.

The vehicle 10 of the present embodiment is structured by plural modules being joined together. As shown in FIG. 1 and FIG. 3, the vehicle 10 is structured to include a center module 16 that structures the vehicle longitudinal direction central portion, a front module 17 that is joined to the vehicle front side of the center module 16, and a rear module 18 that is joined to the vehicle rear side of the center module 16. The front module 17 and the center module 16 are divided with the border therebetween being a portion that is slightly toward the vehicle rear side of the front wheels 24A. The center module 16 and the rear module 18 are divided with the border therebetween being a portion that is slightly toward the vehicle front side of the rear wheels 24B. Here, in the following description, in the longitudinal direction of the vehicle 10, the portion where the front module 17 exists is considered to be the vehicle front portion, the portion where the center module 16 exists is considered to be the vehicle central portion, and the portion where the rear module 18 exists is considered to be the vehicle rear portion (the same holds for the other embodiments as well).

Note that the center module 16, the front module 17 and the rear module 18 may be modules that respectively structure only the vehicle lower side. The vehicle 10 in this case is formed by further joining a roof module that structures the vehicle upper side to the center module 16, the front module 17 and the rear module 18 that are joined together.

The center module 16 is structured to include the vehicle longitudinal direction central portions of the side wall portions 20D, a battery case 31, and a freezer 50 that serves as a temperature-adjustable storage unit. Note that, in the present embodiment, plural types of center modules 16 having different lengths in the vehicle longitudinal direction are readied.

Figure 4:
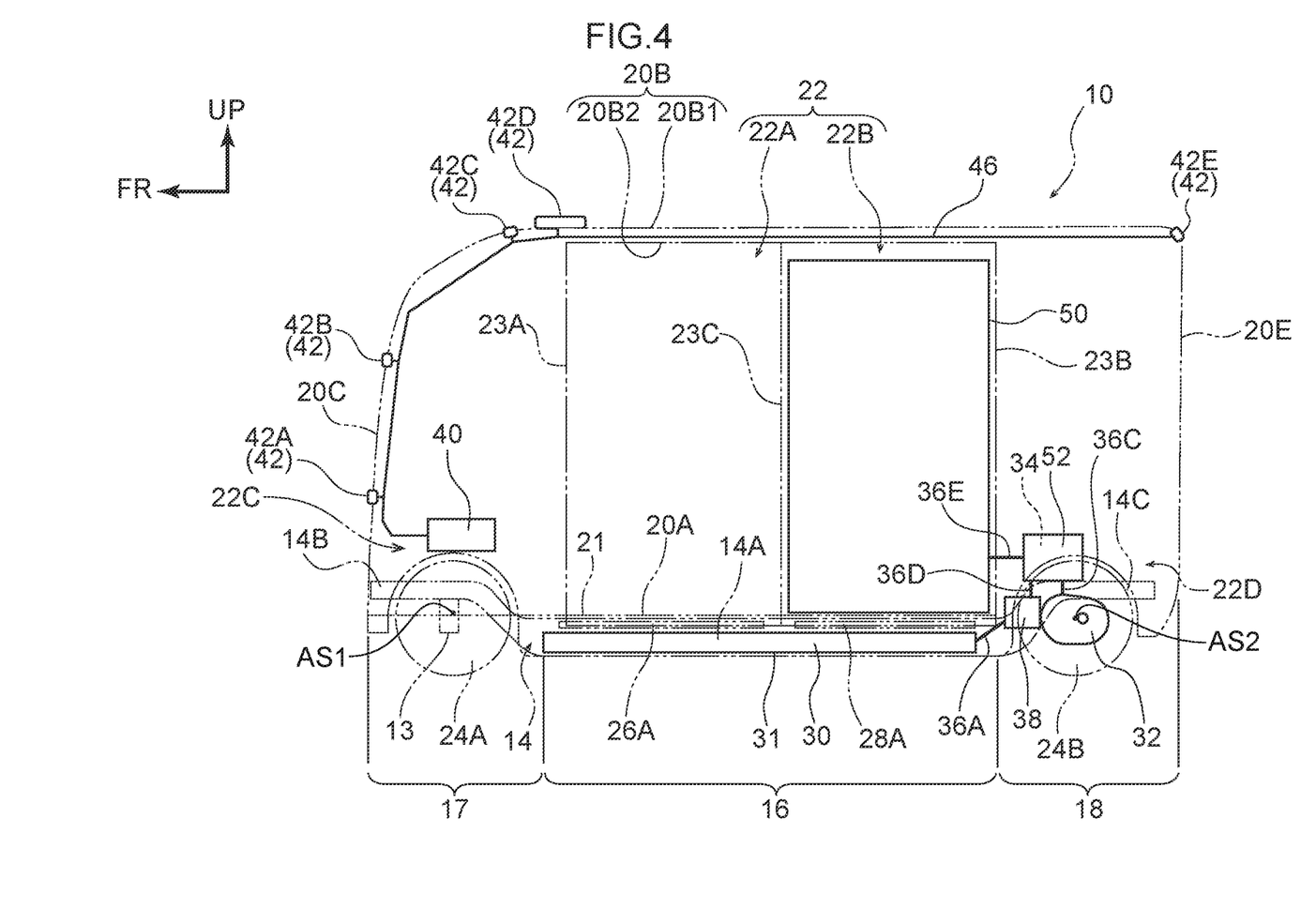
FIG. 4 is a side sectional view of the electric vehicle relating to the first embodiment, and is a drawing explaining a device relating to autonomous driving.

The front module 17 is structured to include the front wall portion 20C, the vehicle front portions of the side wall portions 20D, and an autonomous driving unit 40 (see FIG. 4).

The rear module 18 is structured to include the rear wall portion 20E, the vehicle rear portions of the side wall portions 20D, a driving unit 32, a power unit 34, and an electric power converting unit 52.

A pair of side members 14 that extend in the vehicle longitudinal direction are provided at the lower portion of the vehicle 10. The side member 14 has a center side member 14A, which extends from the vehicle rear portion of the front wheel 24A to the vehicle front portion of the rear wheel 24B, and a front side member 14B that is bent toward the vehicle transverse direction inner side and the vehicle upper side from the center side member 14A, and thereafter, extends toward the vehicle front. Further, the side member 14 has a rear side member 14C that is bent toward the vehicle transverse direction inner side and the vehicle upper side from the center side member 14A, and thereafter, extends toward the vehicle rear. Note that the center side members 14A are provided at the center module 16, the front side members 14B are provided at the front module 17, and the rear side members 14C are provided at the rear module 18.

A front axle 13 that supports the front wheels 24A is fixed to the front side members 14B. The driving unit 32 for driving the rear wheels 24B is fixed to the rear side members 14C.

As shown in FIG. 1, the vehicle 10 has a cargo room 22 that serves as an in-vehicle space portion and that is provided at the center module 16, a sub-unit chamber 22C that is provided at the front module 17, and a power unit chamber 22D that is provided at the rear module 18. The cargo room 22 and the sub-unit chamber 22C are partitioned by a dash panel 23A. The cargo room 22 and the power unit chamber 22D are partitioned by a dash panel 23B.

The cargo room 22 is a substantially rectangular parallelepiped space, and includes a normal temperature room 22A that is at the vehicle front side and has a space that is normal temperature and at which temperature adjustment is not carried out, and an equipment room 22B that is at the vehicle rear side and in which the freezer 50 is housed. The normal temperature room 22A and the equipment room 22B are partitioned in the vehicle longitudinal direction by a sliding-type cargo room door 23C. Note that doors that can open and close are provided at the vehicle front side and the vehicle transverse direction left side of the freezer 50 of the present embodiment. At the time when the cargo room door 23C is opened, the door at the vehicle front side can be opened. At the time when a rear sliding door 27A that is described later is opened, the door at the vehicle transverse direction left side can be opened.

A floor surface 20A is formed by a flat floor panel 21 at the cargo room 22 of the present embodiment. The floor surface 20A is positioned further toward the vehicle lower side than an axle AS1 of the front wheels 24A and an axle AS2 of the rear wheels 24B. Further, the cargo room 22 is formed to a height that is such that a worker who loads and unloads cargo can be in the vehicle 10 in a standing posture. Note that, because most of the space of the equipment room 22B of the cargo room 22 is occupied by the freezer 50, the space where a worker can actually be in the vehicle is limited to the normal temperature room 22A. A dummy having the physique of a standard (average) adult, e.g., an AM 50 (50th percentile U.S. adult male) internationally standardized side crash dummy (World Side Impact Dummy: World SID), can be used as an example of the "worker" here. Namely, the cargo room 22 of the present embodiment has a height that is such that there is a clearance between an inner panel 20B2 that structures the roof 20B and the head portion of an AM 50 dummy when the AM 50 dummy is in a standing state. Note that the example of the worker is not limited to an AM 50 dummy, and can be another crash dummy or a model of an average physique that is obtained statistically.

A battery 30 is housed beneath the floor of the cargo room 22, and specifically, at the vehicle lower side of the floor panel 21 at the vehicle central portion. In further detail, the battery 30 is housed in the battery case 31 that is provided between the pair of center side members 14A, which are disposed at the vehicle central portion, and is fixed to the center side members 14A.

A front opening portion 25 and a rear opening portion 27 are provided, as opening portions through which cargo can be loaded and unloaded, in the side wall portion 20D that is the wall portion at the vehicle transverse direction left side at the cargo room 22.

The front opening portion 25 is for the vehicle front side of the cargo room 22, i.e., for the normal temperature room 22A. The front opening portion 25 is closed by a front sliding door 25A that is slidingly fixed to the vehicle front side. Further, as shown in FIG. 2 and FIG. 3, a front ramp 26, which is a ramp that extends at a downward incline from the floor surface 20A toward the sidewalk (or the roadway), is provided at the front opening portion 25. When the vehicle 10 is traveling, the front ramp 26 is accommodated in a front accommodating portion 26A (see FIG. 1) that is provided in the gap between the floor panel 21 and the battery case 31. In the state of usage in which a worker is loading or unloading cargo, the front ramp 26 is pulled-out toward the side of the vehicle from the front accommodating portion 26A.

As shown in FIG. 1, the rear opening portion 27 is for the vehicle rear side of the cargo room 22, i.e., for the equipment room 22B. The rear opening portion 27 is closed by the rear sliding door 27A that is slidingly fixed to the vehicle rear side. Further, as shown in FIG. 2 and FIG. 3, a rear ramp 28, which is a ramp that extends at a downward incline from the floor surface 20A toward the sidewalk (or the roadway), is provided at the rear opening portion 27. When the vehicle 10 is traveling, the rear ramp 28 is accommodated in a rear accommodating portion 28A (see FIG. 1) that is provided in the gap between the floor panel 21 and the battery case 31. In the state of usage in which a worker is loading or unloading cargo, the rear ramp 28 is pulled-out toward the side of the vehicle from the rear accommodating portion 28A.

Note that, as seen in a plan view, the front accommodating portion 26A is formed at position that does not overlap the rear accommodating portion 28A, in a state of being apart from the rear accommodating portion 28A. Namely, as seen in a plan view, the front ramp 26 does not overlap the rear ramp 28, and is accommodated at a position removed therefrom.

As shown in FIG. 4, the autonomous driving unit 40 that serves as a controlling unit is housed in the sub-unit chamber 22C. The autonomous driving unit 40 is structured to include an autonomous driving ECU that controls the autonomous driving of the vehicle 10, an interface ECU that controls the communication between the steering unit and the acceleration/deceleration unit, and the like. Plural sensors 42 that acquire the situation at the periphery of the vehicle 10 are connected to the autonomous driving unit 40. These sensors 42 include cameras that capture images of predetermined ranges, millimeter wave radar that transmits survey waves over a predetermined range, and LIDAR (Light Detection and Ranging/Laser Imaging Detection and Ranging) that scans a predetermined range. Note that the front opening portion 25 and the rear opening portion 27 are omitted from FIG. 4.

The sensors 42 include front portion sensors 42A, 42B that are provided at the front surface of the vehicle 10, upper portion sensors 42C, 42D that are provided at the upper surface of an outer panel 20B1 at the vehicle front side, and a rear portion sensor 42E that is provided at the end portion of the outer panel 20B1 at the vehicle rear side. The respective sensors 42 and the autonomous driving unit 40 are connected by a signal cable 46 that serves as a wire. Note that a camera is disposed at at least one of the front portion sensors 42A, 42B that are at the vehicle front side and the upper portion sensor 42C, in order to identify the statuses of traffic lights that are on the traveling route.

The signal cable 46, which extends from the autonomous driving unit 40 toward the vehicle upper side, is, midway therealong, connected to the front portion sensors 42A, 42B and the upper portion sensor 42C, and thereafter, is connected to the upper portion sensor 42D. The signal cable 46 extends from the upper portion sensor 42D toward the vehicle rear side and is connected to the rear portion sensor 42E. Here, at the roof 20B side, the signal cable 46 is disposed along the vehicle longitudinal direction between the outer panel 20B1 and the inner panel 20B2 that structure the roof 20B.

As shown in FIG. 1 and FIG. 3, in addition to the driving unit 32, the power unit 34 that serves as an electric power converter for driving, the electric power converting unit 52 that serves as an electric power converter for the storage unit, and a branch box 38 are housed in the power unit chamber 22D. At the driving unit 32, at least a motor for traveling and a transaxle are made into a unit, and the driving unit 32 is housed in a case made of metal. Further, at the power unit 34, at least a boost converter and an inverter are made into a unit. At the electric power converting unit 52, a boost converter and an inverter are made into a unit.

The power unit 34 is disposed at the vehicle transverse direction right side of the driving unit 32, and between the rear end portion of the battery case 31 and the rear end portion of the driving unit 32 in the vehicle longitudinal direction. The electric power converting unit 52 is disposed at the vehicle transverse direction left side of the driving unit 32, and between the rear end portion of the battery case 31 and the rear end portion of the driving unit 32 in the vehicle longitudinal direction. Moreover, the branch box 38 is disposed at the vehicle transverse direction center, between the rear end portion of the battery case 31 and the front end portion of the driving unit 32 in the vehicle longitudinal direction.

Here, the power unit 34 is electrically connected from the battery 30 via the branch box 38. Further, the electric power converting unit 52 is electrically connected from the battery 30 via the branch box 38. Namely, the branch box 38 functions to branch the electric power of the battery 30 between the power unit 34 and the electric power converting unit 52.

The battery 30 and the branch box 38 are connected by a single power cable 36A. The branch box 38 and the power unit 34 are connected by a power cable 36B. The power unit 34 and the driving unit 32 are connected by a power cable 36C. Moreover, the branch box 38 and the electric power converting unit 52 are connected by a power cable 36D. The electric power converting unit 52 and the freezer 50 are connected by a power cable 36E.

(Method of Manufacturing Vehicle)

In the present embodiment, first, the center module 16, the front module 17 and the rear module 18 are respectively manufactured. For example, at the center module 16, the cargo room 22 is formed by the roof 20B, the side wall portions 20D and the floor panel 21 of the vehicle central portion. Further, at the center module 16, the center side members 14A are installed, and the battery case 31 is fixed to the center side members 14A. Note that, although the dash panel 23A and the dash panel 23B can be assembled to the center module 16, in this case, the dash panel 23A and the dash panel 23B are assembled after the freezer 50 is accommodated in the cargo room 22.

Further, at the front module 17, the sub-unit chamber 22C is formed by the front wall portion 20C, the roof 20B of the vehicle front portions and the side wall portions 20D of the vehicle front portions. At the front module 17, the front side members 14B, the front axle 13 and the front wheels 24A are installed, and the autonomous driving unit 40 is fixed to the interior of the sub-unit chamber 22C.

Moreover, at the rear module 18, the power unit chamber 22D is formed by the rear wall portion 20E, the roof 20B of the vehicle rear portions and the side wall portions 20D of the vehicle rear portions. At the rear module 18, the rear side members 14C, the driving unit 32 and the rear wheels 24B are installed. Further, the power unit 34, the electric power converting unit 52 and the branch box 38 are fixed to the interior of the power unit chamber 22D.

Then, the front module 17 and the rear module 18 are joined to the center module 16. At the time of joining the respective modules, the autonomous driving unit 40 and the respective sensors 42 are connected by the signal cable 46. Further, the battery 30 and the branch box 38 are connected by the power cable 36A.

Summary of First Embodiment

At the vehicle 10 of the present embodiment, the battery 30 is housed at the vehicle lower side of the floor panel 21 which is the region beneath the floor at the vehicle central portion. The region at the vehicle upper side of the floor panel 21 is formed as the cargo room 22. Here, the front axle 13 and the front wheels 24A are disposed at the vehicle front portion, and the driving unit 32 and the rear wheels 24B are disposed at the vehicle rear portion. Therefore, there are limits to decreasing the height of the floor at the vehicle front portion and the vehicle rear portion. On the other hand, at the vehicle central portion, lowering of the floor surface 20A is devised by placing the battery 30 further toward the vehicle lower side than the axle AS1 of the front wheels 24A and the axle AS2 of the rear wheels 24B, and a height such that it is possible for a worker to stand in the cargo room 22 is ensured.

Because the vehicle 10 of the present embodiment is a completely autonomous-driving vehicle, it is not absolutely necessary to provide a driver's seat, and the layout of the cargo room 22 interior can be set freely. Namely, in accordance with the present embodiment, equipment corresponding to the application can be accommodated in a flat and wide space that is due to the low-floor, box-shaped, barrier-free design. In a case in which cargo that requires temperature control is transported, other than the freezer 50 of the present embodiment, a refrigerator that can refrigerate and a heating cabinet that can heat the contents thereof are examples of the equipment corresponding to the application.

Further, for example, in a case in which the vehicle 10 is used as a mobile workshop, machine tools are examples of the equipment corresponding to the application. In a case in which the vehicle 10 is used as a mobile laundry, washers and driers are examples of the equipment corresponding to the application.

Further, in the present embodiment, the vehicle front side of the cargo room 22 is the normal temperature room 22A, and the freezer 50 is disposed in the equipment room 22B that is at the vehicle rear side. Due to the freezer 50 being disposed near to the vehicle rear side where the electric power converting unit 52 is located, the length of the power cable 36E that connects the freezer 50 and the electric power converting unit 52 can be kept shorter. Further, by consolidating together, at the vehicle rear portion, the battery 30, the branch box 38, the power unit 34, the driving unit 32, the electric power converting unit 52 and the freezer 50 through which high-voltage current flows, the overall lengths of the power cables 36A through 36E can be shortened. As described above, in accordance with the present embodiment, lightening of the weight of the power cables 36A through 36E which are heavy parts can be devised as compared with a case in which these respective devices are disposed so as to be dispersed about.

In the vehicle 10 of the present embodiment, the power unit 34 and the electric power converting unit 52 are disposed between the rear end portion of the battery case 31 and the rear end portion of the driving unit 32 in the vehicle longitudinal direction. Here, the driving unit 32 includes the motor for traveling and the transaxle, and has a case that is made of metal and has high rigidity. Therefore, in a case in which the vehicle 10 that is traveling toward the vehicle rear side collides with an obstacle or the like, or at the time of a collision in a case in which the vehicle 10 is collided-with from the vehicle rear side, the driving unit 32 functions as an impact resistant portion. In accordance with the present embodiment, by placing the power unit 34 and the electric power converting unit 52 further toward the vehicle longitudinal direction inner side than the driving unit 32, damage to the power unit 34 and the electric power converting unit 52 can be suppressed without reinforcing the vehicle rear portion. Namely, safety with respect to a collision can be ensured in an electric automobile in which equipment such as the freezer 50 or the like is installed.

In the vehicle 10 of the present embodiment, the autonomous driving unit 40 and the respective sensors 42 are disposed at the vehicle front portion and the vehicle upper portion. In contrast, the battery 30, the power cables 36A through 36E, the branch box 38, the power unit 34, the driving unit 32 and the electric power converting unit 52 are disposed toward the vehicle lower sides of the vehicle central portion and the vehicle rear portion. Namely, in the present embodiment, the autonomous driving unit 40 and the sensors 42 are set apart from the battery 30, the power cables 36A through 36E, the branch box 38, the power unit 34, the driving unit 32 and the electric power converting unit 52. In accordance with the present embodiment, influence of electromagnetic noise, generated from the devices through which high-voltage current flows, on the control signals of the autonomous driving unit 40 and the sensors 42 can be reduced.

Further, the signal cable 46 that connects the autonomous driving unit 40 and the respective sensors 42 is disposed from the vehicle front side to the vehicle upper side. The signal cable 46 also is disposed so as to be apart from the devices through which high-voltage current flows. Namely, in accordance with the present embodiment, by setting the signal cable 46 that is easily affected by noise far from the devices through which high-voltage current flows, influence of electromagnetic noise, generated from the devices through which high-voltage current flows, on the autonomous driving control signals, can be reduced.

Further, in the vehicle 10 of the present embodiment, by using the branch box 38, the power source for the freezer 50 and the battery 30 that is the power source for driving can be used in common. Due thereto, a lowering of weight and a decrease in cost of the vehicle 10 can be devised as compared with a case in which a battery for the freezer 50 is provided separately. Further, in accordance with the present embodiment, by ensuring, for the freezer 50, a power source of a system that is separate from the driving system, the appropriate converters and inverters can be selected in accordance with the capacity of the freezer 50 and the needed electric power, regardless of the output of the driving system. Due thereto, a further lowering of weight and reduction in cost can be devised.

At the vehicle 10 of the present embodiment, the front opening portion 25 and the rear opening portion 27 through which cargo can be loaded and unloaded are provided at the side wall portion 20D that is at the vehicle transverse direction left side of the cargo room 22. Further, the front ramp 26 is provided from the floor surface 20A of the front opening portion 25 that is at the normal temperature room 22A side toward the sidewalk or the roadway, and the rear ramp 28 is provided from the floor surface 20A of the rear opening portion 27 that is at the equipment room 22B side toward the sidewalk or the roadway. Due thereto, in accordance with the present embodiment, the work of loading and unloading cargo and dollies from the normal temperature room 22A and the freezer 50 can be carried out easily by eliminating the step between the floor surface 20A and the sidewalk or the roadway.

In particular, by providing the front ramp 26 at the normal temperature room 22A side, unloading and loading into the normal temperature room 22A by a worker is made easy, and, by opening and closing the freezer 50 from the interior of the normal temperature room 22A, a rise in the temperature of the freezer 50 interior can be suppressed as compared with a case in which the freezer 50 is opened and closed from the rear opening portion 27 side. Due thereto, consumption of cooling energy can be suppressed. Further, in the present embodiment, the rear ramp 28 also is provided at the equipment room 22B side. Therefore, even in a case in which the freezer 50 is opened and closed from the rear opening portion 27 side, the opening/closing time can be shortened, and therefore, the consumption of cooling energy can be suppressed as compared with a case in which the rear ramp 28 is not provided.

Note that, in the present embodiment, the freezer 50 is given as an example of the temperature-adjustable storage unit, but the present disclosure is not limited to this, and a refrigerator that can refrigerate, or a heating cabinet that can heat the contents thereof may be set in the equipment room 22B. Further, the setting of the freezer 50, which is the storage unit, within the equipment room 22B in the present embodiment is not limited to this, and the equipment room 22B itself may be a storage unit that is a freezer, a refrigerator, a heating cabinet or the like. In this case, the cargo room door 23C and the rear sliding door 27A are the opening/closing doors of the storage unit.

The vehicle 10 of the present embodiment is manufactured by combining plural modules. In the vehicle 10 of the present embodiment, the driving unit 32 and the autonomous driving unit 40 are disposed so as to be divided between the front module 17 and the rear module 18. On the other hand, because there are degrees of freedom in the accommodated position and the accommodated shape of the battery 30, correspondence with the center modules 16 that have different lengths can be achieved. In the present embodiment, for example, the manufacturing of vehicles of different sizes can be addressed by readying plural types of center modules for one type of front module and rear module. Concretely, by providing the center modules 16 that have different lengths in the vehicle longitudinal direction for the front module 17 and the rear module 18 that are the same of those of the present embodiment, it is possible to change the sizes of vehicles.

Further, in accordance with the present embodiment, the battery 30 and the branch box 38 can be connected by the single power cable 36A at the joined portion of the center module 16 and the rear module 18. Therefore, a reduction in the number of processes and an improvement in the efficiency of production can be devised when manufacturing vehicles of different sizes.

Note that the manufacturing of vehicles of different sizes may also be addressed by fixing the length of the center module so as to make the center module be a common module, and preparing front modules or rear modules that have different vehicle longitudinal direction lengths.

Further, although the vehicle 10 of the present embodiment is a vehicle that has been modularized, the manufacturing of vehicles of different sizes can easily be addressed also for vehicles that are manufactured by the assembling of parts and are not modularized. For example, the vehicles 10 of different vehicle longitudinal direction lengths can be easily manufactured by readying the center side members 14A, the side wall portions 20D, the floor panels 21, the battery cases 31 and the like that have different length dimensions.

Second Embodiment

In a vehicle 10A of the second embodiment, the form of the freezer that is accommodated in the equipment room 22B, and the placement of the electric power converting unit 52, differ from the first embodiment. Hereinafter, the points that differ from the first embodiment are described by using FIG. 5. Note that illustration of the front opening portion 25, the front sliding door 25A, the front ramp 26, the rear opening portion 27, the rear sliding door 27A and the rear ramp 28 is omitted in FIG. 5. Further, structures that are the same as those of the first embodiment are denoted by the same reference numerals.

Figure 5:
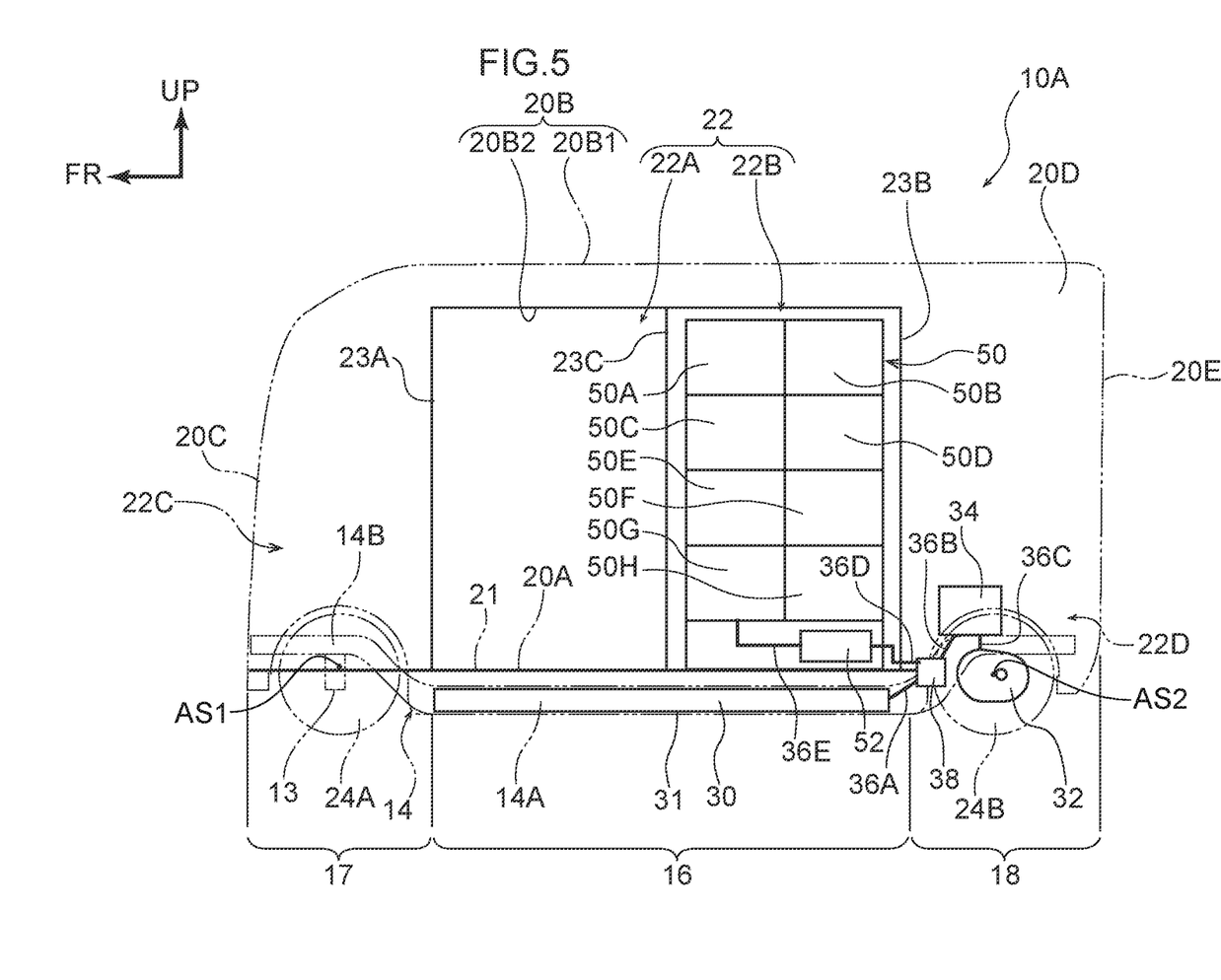
FIG. 5 is a side sectional view of an electric vehicle relating to a second embodiment.

As shown in FIG. 5, the freezer 50 that is accommodated in the equipment room 22B of the present embodiment is sectioned into a total of eight parts that are in two columns and four levels. Concretely, the freezer 50 has, from the vehicle upper side, first level lockers 50A and 50B, second level lockers 50C and 50D, third level lockers 50E and 50F, and fourth level lockers 50G and 50H. Further, in the present embodiment, the electric power converting unit 52 is disposed not in the power unit chamber 22D, but at the vehicle lower side of the lockers 50G and 50H of the freezer 50 that is within the equipment room 22B.

In the vehicle 10A of the present embodiment, the power cable 36D extends from the branch box 38 toward the vehicle front side, and is connected to the electric power converting unit 52. Further, the power cable 36E that connects the electric power converting unit 52 and the respective lockers 50A through 50H is disposed at the interior of the freezer 50.

In the present embodiment, the electric power converting unit 52 is disposed within the equipment room 22B (the freezer 50) that is at the vehicle upper side of the battery case 31. Here, the battery case 31 in which the battery 30 is accommodated is sandwiched between the center side members 14A in the vehicle transverse direction, and is sandwiched between the front side members 14B and the rear side members 14C in the vehicle longitudinal direction. Namely, the side members 14 function as impact resistant portions. Accordingly, in accordance with the present embodiment, due to the electric power converting unit 52 being disposed at the vehicle upper side of the battery case 31, damage to the electric power converting unit 52 can be suppressed without reinforcing the vehicle central portion.

Note that, although the power unit 34 is in the power unit chamber 22D, as described above, the power unit 34 is disposed between the rear end portion of the battery case 31 and the rear end portion of the driving unit 32 in the vehicle longitudinal direction, and damage at the time of a collision is suppressed. Accordingly, in the present embodiment as well, in the same way as in the first embodiment, safety with respect to a collision can be ensured in an electric automobile in which equipment such as the freezer 50 or the like is installed.

In addition, in accordance with the vehicle 10A of the present embodiment, operation and effects that are similar to those of the vehicle 10 of the first embodiment are achieved.

Note that, in the present embodiment, all of the lockers 50A through 50H have a freezing function, but the present disclosure is not limited to this. For example, all of the lockers 50A through 50H may be refrigerators that have a refrigerating function or heating cabinets that have a heating function. Further, refrigerating, freezing, and heating functions may be set individually per locker 50A through 50H.

Third Embodiment

A vehicle 10B of a third embodiment differs from the first embodiment with regard to the point at which an equipment battery 54 is provided as a battery that is used exclusively for the freezer 50. Hereinafter, the points that differ from the first embodiment are described by using FIG. 6. Note that illustration of the front opening portion 25, the front sliding door 25A, the front ramp 26, the rear opening portion 27, the rear sliding door 27A and the rear ramp 28 is omitted in FIG. 6. Further, structures that are the same as those of the first embodiment are denoted by the same reference numerals.

Figure 6:
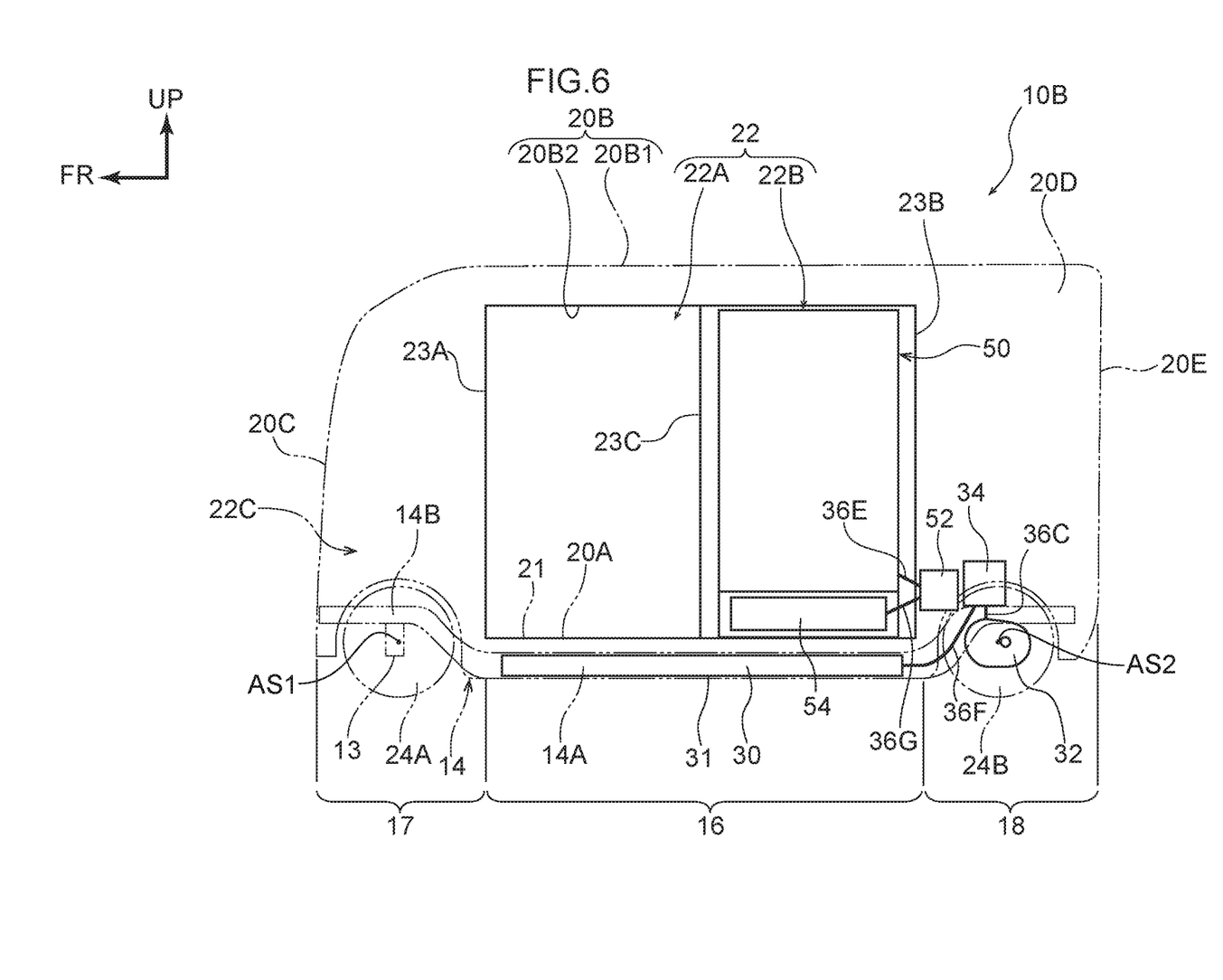
FIG. 6 is a side sectional view of an electric vehicle relating to a third embodiment.

As shown in FIG. 6, in the equipment room 22B of the present embodiment, the equipment battery 54 is disposed at the bottom portion of the freezer 50. Further, in the present embodiment, the branch box 38 is not provided.

At the vehicle 10B of the present embodiment, the battery 30 and the power unit 34 are directly connected by the power cable 36F, and the power unit 34 and the driving unit 32 are connected by the power cable 36C. Further, the equipment battery 54 and the electric power converting unit 52 are connected by the power cable 36G, and the electric power converting unit 52 and the freezer 50 are connected by the power cable 36E.

In the present embodiment, in the same way as in the first embodiment, the power unit 34 and the electric power converting unit 52 are disposed between the rear end portion of the battery case 31 and the rear end portion of the driving unit 32 in the vehicle longitudinal direction. Namely, in the same way as in the first embodiment, damage to the power unit 34 and the electric power converting unit 52 at the time of a collision is suppressed.

Further, in the present embodiment, the equipment battery 54 is disposed at the interior of the equipment room 22B (the freezer 50) that is at the vehicle upper side of the battery case 31. Namely, in the same way as with the electric power converting unit 52 of the second embodiment, damage to the equipment battery 54 at the time of a collision is suppressed.

As described above, in the present embodiment as well, in the same way as in the first and second embodiments, safety with respect to a collision can be ensured in an electric automobile in which equipment such as the freezer 50 or the like is installed.

In accordance with the vehicle 10B of the present embodiment, because an independent power source is provided, a supply of electric power that is needed for the freezer 50 can be received without having to worry about the capacity of the battery 30 which is the power source for driving.

In addition, in accordance with the vehicle 10B of the present embodiment, operation and effects that are similar to those of the vehicle 10 of the first embodiment are achieved.

Note that, in the present embodiment, the electric power converting unit 52 is disposed in the power unit chamber 22D, but the present disclosure is not limited to this. The electric power converting unit 52 may be disposed, together with the equipment battery 54, at the interior of the freezer 50 in the equipment room 22B.

[Supplemental Explanation]

Note that, in the above-described respective embodiments, the autonomous driving unit 40 is disposed in the sub-unit chamber 22C that is at the vehicle front portion, and the driving unit 32 and the like are disposed in the power unit chamber 22D that is at the vehicle rear portion. However, the arrangement in the vehicle longitudinal direction may be reversed. Namely, the driving unit 32 and the like can be disposed at the vehicle front portion, and the autonomous driving unit 40 can be disposed at the vehicle rear portion. In this case, by placing the freezer 50 at the vehicle front side of the cargo room 22, the lengths of the wires that connect the freezer 50 and the electric power converting unit 52 can be shortened.

Although the entire in-vehicle space portion is made to be the cargo room 22 in the above-described respective embodiments, the present disclosure is not limited to this. For example, all of the normal temperature room 22A may be made to be a vehicle cabin, or a portion of the normal temperature room 22A may be used as the vehicle cabin.

Although the above-described respective embodiments are completely autonomous-driving vehicles that do not have a driver's seat, the present disclosure is not limited to this, and may be a autonomous-driving vehicle that has a driver's seat. Namely, the respective embodiments can be structured such that autonomous driving is carried out usually, and manual driving is made possible at times of avoiding danger or at arbitrary times. Note that the sub-unit chamber 22C can be divided up and down in the vehicle vertical direction, and, by placing the autonomous driving unit 40 at the vehicle lower side, the driver's seat can be provided at the vehicle upper side.

Although an electric automobile is used as an example of the electric vehicle in the above-described embodiments, the present disclosure is not limited to this, and the electric vehicle may be a fuel cell vehicle. In this case, safety with respect to a collision can be ensured by placing the hydrogen tanks and the fuel cell stack within the range between the front end portion of the battery case 31 and the rear end portion of the driving unit 32.

What is claimed is:

1. An electric vehicle comprising:
a battery that is accommodated beneath a floor of an in-vehicle space portion;
a temperature-adjustable storage unit that is accommodated in the in-vehicle space portion;
a driving unit that is provided at a vehicle longitudinal direction one side of the battery;
an electric power converter for driving that is disposed, in a vehicle longitudinal direction, disposed within a range that extends from the battery to an end portion of a vehicle longitudinal direction outer side of the driving unit, and that is electrically connected to the battery and the driving unit;
an electric power converter for the storage unit that is disposed within the range and that is electrically connected to the storage unit; and
a control unit that controls autonomous driving of the vehicle.

2. The electric vehicle of claim 1, wherein the control unit is disposed at a vehicle longitudinal direction another side of the battery.

3. The electric vehicle of claim 1, further comprising a branch box that is electrically connected to the battery, and that branches electric power of the battery between the electric power converter for driving and the electric power converter for the storage unit.

4. The electric vehicle of claim 1, further comprising:
an opening that is provided in a vehicle transverse direction wall portion at the in-vehicle space portion, and through which cargo can be loaded and unloaded; and
a ramp that can be accommodated between the battery and a floor surface of the in-vehicle space portion, and that, at the opening portion, extends from the floor surface toward an exterior of the in-vehicle space portion.

5. The electric vehicle of claim 4, wherein:
the opening portion includes a front opening portion that is at a vehicle front side and a rear opening portion that is at a vehicle rear side, and
the ramp includes:
a front ramp that is set for the front opening portion in a state of usage, and that is accommodated beneath the floor, and
a rear ramp that is set for the rear opening portion in a state of usage, and that is accommodated beneath the floor so as to be apart from the front ramp as seen in a plan view.

6. The electric vehicle of claim 5, wherein:
the in-vehicle space portion includes a normal temperature room that is a space at which temperature adjustment is not carried out,
the front opening portion is an entrance to either of the normal temperature room or an equipment room in which the storage unit is accommodated, and
the rear opening portion is an entrance to another of the normal temperature room or the equipment room.

7. The electric vehicle of claim 6, wherein the normal temperature room has a height such that a worker can stand therein.

8. The electric vehicle of claim 1, wherein:
the in-vehicle space portion includes a normal temperature room that is a space at which temperature adjustment is not carried out, and
the storage unit is disposed in the in-vehicle space portion further toward the driving unit side than the normal temperature room.

* * * * *